US006608852B2

(12) United States Patent
Govorkov et al.

(10) Patent No.: US 6,608,852 B2
(45) Date of Patent: Aug. 19, 2003

(54) GAIN MODULE FOR DIODE-PUMPED SOLID STATE LASER AND AMPLIFIER

(75) Inventors: Sergei V. Govorkov, Boca Raton, FL (US); Alexander Oliver Wolfgang Wiessner, Coconut Creek, FL (US)

(73) Assignee: Lameda Physik AG, Goettingen (DE)

( * ) Notice: Subject to any disclaimer, the term of this patent is extended or adjusted under 35 U.S.C. 154(b) by 0 days.

(21) Appl. No.: 09/938,329

(22) Filed: Aug. 21, 2001

(65) Prior Publication Data

US 2002/0027937 A1 Mar. 7, 2002

Related U.S. Application Data

(60) Provisional application No. 60/228,185, filed on Aug. 25, 2000.

(51) Int. Cl.[7] ............................................. H01S 3/091
(52) U.S. Cl. ........................................... 372/75; 372/70
(58) Field of Search ........................... 372/75, 70

(56) References Cited

U.S. PATENT DOCUMENTS

| 3,140,451 A | 7/1964 | Fox ............................ 331/94.5 |
| 3,222,615 A | 12/1965 | Holly ........................ 331/994.5 |
| 3,663,893 A | 5/1972 | Ostermayer, Jr. ............ 331/94.5 |

(List continued on next page.)

FOREIGN PATENT DOCUMENTS

| CA | 1303198 | 6/1992 | ............ H01S/3/085 |
| DE | 2 105 480 | 8/1972 | ............ H01S/3/16 |
| DE | 2 225 277 | 12/1973 | ............ H01S/3/11 |
| DE | 42 19 169 A1 | 6/1992 | ............ H01S/3/10 |
| DE | 689 15 421 T2 | 9/1994 | ............ H01S/3/094 |
| DE | 44 38 283 C2 | 4/1997 | ............ H01S/3/08 |
| EP | 0 378 390 | 1/1990 | |
| EP | 0 493 235 A1 | 7/1992 | ............ H01S/3/094 |
| FR | 1 379 259 | 12/1963 | |
| FR | 2592530 | 12/1986 | ............ H01S/3/16 |
| GB | 1 333 892 | 1/1972 | ............ H01S/3/11 |
| JP | 1-248582 | 10/1989 | ............ H01S/3/094 |
| JP | 05259540 | 10/1993 | ............ H01S/3/094 |
| JP | 5-259540 | 10/1993 | ............ H01S/3/094 |

OTHER PUBLICATIONS

M. Fuller et al., "High–gain end–pumped lasers," *1998 CLEO Conference*, May 7, 1998, 2 pages in length.
Patent Abstracts of Japan: Publication No. 05259540, Aug. 10, 1993, Application No. 04051316, Oct. 3, 1992, Int. Class: H01S 3/094.
Fuller, M., et al., "High–gain end–pumped lasers," *Cleo '98*, pp. 431–432.

(List continued on next page.)

*Primary Examiner*—Paul Ip
*Assistant Examiner*—Leith Al Nazer
(74) *Attorney, Agent, or Firm*—Stallman & Pollock LLP

(57) ABSTRACT

A side-pumped, diode-pumped solid state laser device includes an elongated housing having an elongated cavity defined therein and further having an elongated opening defined between the cavity and the exterior of the housing. A solid state rod is disposed within the cavity and is preferably surrounded by a cooling fluid. A cover seal sealably covering the opening and thereby encloses the cavity. The cover seal is formed of a material that is at least substantially transparent to pumping radiation at a predetermined pumping wavelength. A diode array emits the pumping radiation that traverses the cover seal and the opening to be absorbed by the rod to excite laser active species within the rod. The laser device further includes a resonator including the rod disposed therein for generating a laser beam.

77 Claims, 3 Drawing Sheets

U.S. PATENT DOCUMENTS

| | | | |
|---|---|---|---|
| 3,683,296 A | 8/1972 | Scalise | 331/95.5 |
| 3,684,980 A | 8/1972 | Kay | 331/94.5 |
| 3,821,663 A | 6/1974 | Brenner | 331/94.5 R |
| 3,856,056 A | 12/1974 | Melamed et al. | 372/34 |
| 3,858,056 A | 12/1974 | Melamed et al. | 307/88.3 |
| 3,918,007 A | 11/1975 | Waksberg | 331/94.5 M |
| 3,962,576 A | 6/1976 | Kuhl et al. | 250/201 |
| 4,546,477 A | 10/1985 | Richards | 372/12 |
| 4,756,002 A | 7/1988 | Ruggieri et al. | 372/70 |
| 4,794,615 A | 12/1988 | Berger et al. | 372/69 |
| 4,872,177 A | 10/1989 | Baer et al. | 372/75 |
| 4,912,720 A | 3/1990 | Springsteen | 372/72 |
| 4,918,704 A | 4/1990 | Caprara et al. | 372/99 |
| 4,945,544 A | 7/1990 | Tanaka et al. | 372/70 |
| 5,015,054 A | 5/1991 | Chaffee | 350/96.15 |
| 5,033,057 A | 7/1991 | Bosenberg et al. | 372/72 |
| 5,033,058 A * | 7/1991 | Cabaret et al. | 372/75 |
| 5,047,668 A | 9/1991 | Bosenberg | 359/330 |
| 5,048,044 A | 9/1991 | Ireland | 372/66 |
| 5,050,173 A | 9/1991 | Hughes | 372/6 |
| 5,053,641 A | 10/1991 | Cheng et al. | 359/330 |
| 5,062,112 A | 10/1991 | Buchman et al. | 372/3 |
| 5,084,886 A | 1/1992 | Martin | 372/36 |
| 5,093,832 A | 3/1992 | Bethune et al. | 372/21 |
| 5,117,436 A | 5/1992 | Hanson | 372/72 |
| 5,140,607 A | 8/1992 | Paiva | 372/70 |
| 5,171,436 A | 12/1992 | Botsch | 372/72 |
| 5,181,223 A | 1/1993 | Baer et al. | 372/69 |
| 5,197,074 A | 3/1993 | Emmons, Jr. et al. | 372/26 |
| 5,317,585 A * | 5/1994 | Gregor | 372/35 |
| 5,349,600 A | 9/1994 | Shinbori et al. | 372/92 |
| 5,365,366 A | 11/1994 | Kafka et al. | 359/330 |
| 5,455,838 A | 10/1995 | Heritier et al. | 372/75 |
| 5,457,707 A | 10/1995 | Sobey et al. | 372/20 |
| 5,488,626 A | 1/1996 | Heller et al. | 372/70 |
| 5,521,932 A | 5/1996 | Marshall | 372/36 |
| 5,521,936 A | 5/1996 | Irwin | 372/75 |
| 5,559,816 A | 9/1996 | Basting et al. | 372/27 |
| 5,572,541 A | 11/1996 | Suni | 372/70 |
| 5,577,058 A | 11/1996 | Kafka et al. | 372/20 |
| 5,590,147 A | 12/1996 | Hobbs et al. | 372/75 |
| 5,606,453 A | 2/1997 | Walling et al. | 359/330 |
| 5,619,517 A | 4/1997 | Dixon | 372/21 |
| 5,619,522 A | 4/1997 | Dubé | 372/72 |
| 5,623,510 A | 4/1997 | Hamilton et al. | 372/75 |
| 5,627,848 A | 5/1997 | Fermann et al. | 372/18 |
| 5,627,850 A | 5/1997 | Irwin et al. | 372/43 |
| 5,638,388 A | 6/1997 | Nighan, Jr. et al. | 372/22 |
| 5,651,020 A | 7/1997 | Nighan, Jr. et al. | 372/92 |
| 5,657,341 A | 8/1997 | Hyuga | 372/98 |
| 5,659,419 A | 8/1997 | Lokai et al. | 359/330 |
| 5,661,738 A | 8/1997 | Yasui et al. | 372/35 |
| 5,663,973 A | 9/1997 | Stamm et al. | 372/20 |
| 5,671,241 A | 9/1997 | Stamm et al. | 372/20 |
| 5,677,920 A | 10/1997 | Waarts et al. | 372/6 |
| 5,774,488 A * | 6/1998 | Kmetec | 372/69 |
| 5,774,489 A | 6/1998 | Moulton et al. | 372/70 |
| 5,796,513 A | 8/1998 | Stamm et al. | 359/330 |
| 5,838,701 A | 11/1998 | Deutsch et al. | 372/10 |
| 5,838,712 A | 11/1998 | Kraenert et al. | 372/75 |
| 5,847,861 A | 12/1998 | Kafka et al. | 359/330 |
| 5,854,802 A | 12/1998 | Jun et al. | 372/22 |
| 5,867,324 A | 2/1999 | Kmetec et al. | 359/625 |
| 5,870,421 A | 2/1999 | Dahm | 372/75 |
| 5,875,206 A | 2/1999 | Chang | 372/75 |
| 5,896,220 A | 4/1999 | Stamm et al. | 359/330 |
| 5,898,718 A | 4/1999 | Mohatt et al. | 372/22 |
| 5,905,745 A | 5/1999 | Grubb et al. | 372/6 |
| 5,909,306 A | 6/1999 | Goldberg et al. | 359/341 |
| 5,930,030 A | 7/1999 | Scifres | 359/341 |
| 5,963,363 A | 10/1999 | Weston et al. | 359/345 |
| 5,978,407 A | 11/1999 | Chang et al. | 372/72 |
| 5,987,049 A | 11/1999 | Weingarten et al. | 372/70 |
| 5,995,523 A | 11/1999 | Xie | 372/22 |
| 6,002,695 A | 12/1999 | Alfrey et al. | 372/22 |
| 6,002,697 A | 12/1999 | Govorkov et al. | 372/34 |
| 6,009,114 A | 12/1999 | Heller et al. | 372/75 |
| 6,021,141 A | 2/2000 | Nam et al. | 372/20 |
| 6,026,109 A | 2/2000 | Micke et al. | 372/92 |
| 6,028,870 A | 2/2000 | Deutsch et al. | 372/25 |
| 6,075,803 A | 6/2000 | Bull et al. | 372/75 |

OTHER PUBLICATIONS

Honea, E.C., et al., "183–W, $M^2$=2.4 Yb:YAG Q–Switched Laser," *Optics Letters*, Feb. 1, 1999, vol. 24, No. 3, pp. 154–156.

Devlin, et al., "Composite Rod Optical Masers," *Applied Optics*. vol. 1, No. 1, Jan. 1962, pp. 11–15.

Grau, et al., "Modulation von Licht Mittels Elektrisch Doppedlbrechender Kristalle," *Zeitschrift für angewandte Physik XVII Band*, Heft 1,1964, pp. 16–20.

V. Evtuhov, et al., "'Twisted–Mode' Technique for Obtaining Axially Uniform Energy Density in a Laser Cavity," *Applied Optics*, vol. 4, No. 1, Jan. 1965, pp. 142–143.

P.W. Smith, "Stabilized, Single–Frequency Output from a Long Laser Cavity," *IEEE J. Quant. Elect.* 1, 343 (1965), pp. 343–348.

R. V. Pole, "Active Optical Imaging System," *IBM Technical Disclosure Bulletin*, vol. 7, No. 12, May 1965, pp. 1200.

Park, et al., "Stable Single–Axial–Mode Operation of an Unstable–Resonator Nd:Yag Oscillator by Injection Locking," *Opt. Lett* 5, 1980, pp. 96–98.

Y. K. Park, et al., "Electronic Linewidth Narrowing for Single Axial Mode Operation of Q–Switched Nd: YAG Lasers," *Optics Communications*, vol. 37, No. 6, Jun. 15, 1981, pp. 411–416.

Golla, et al., "300–W cw Diode–Laser Side–Pumped Nd:YAG Rod Laser," *Optics Letters*, vol. 20, No. 10, May 15, 1985, pp. 1148–1150.

A. E. Siegman, "Lasers," University Science Books, Mill Valley, California 1986, pp. 1034–1039.

T. J. Kane, et al., "Frequency Stability and Offset Locking of a Laser–Diode–Pumped Nd:YAG Monolithic Nonplanar Ring Oscillator," *Opt. Lett.*, 1987, vol. 12, No. 3, pp. 175–177.

Herausgegeben von Heinz Haferkorn, "Lexikon der Optik," *Dausien*, 1988, 5 pages.

Hanson, et al., "Laser Diode Side Pumping of Neodymium Laser Rods," *Applied Optics*, vol. 27, No. 1, Jan. 1988, pp. 80–83.

J–C Lee, et al., "$TEM_{00}$–Mode and Single–Longitudinal–Mode Laser Operation with a Cholesteric Liquid–Crystal Laser End Mirror," *Optics Letters*, vol. 15, No. 17, Sep. 1, 1990, pp. 959–961.

J. Liang, et al., "Demonstration of a Tunable Single Longitudinal Mode Q–Switched Solid–State Source Using Injection Seeded Nd:YAP," *Opt. Comm.*, May 1, 1991, vol. 29, No. 5, 6, pp. 509–513.

Welford, et al., "Efficient $TEM_{00}$–Mode Operation of a Laser–Diode Side–Pumped Nd:YAG Laser," *Optics Letters*, vol. 16, No. 23, Dec. 1, 1991, pp. 1850–1852.

J. M. Plorin, et al., "Diode–Pumped, Actively Stabilizewd 1 W Single–Frequency–Laser for Optical Measurement and Testing," *Laser in der Technik Laser in Engineering*, Laser 91, Springer–Verlag Berlin Heidelberg 1992, pp. 103–107.

Kasinski, et al., "One Joule Output From a Diode–Array–Pumped Nd:YAG Laser with Side–Pumped Rod Geometry," *Journal of Quantum Electronics*, vol. 28, No. 4, Apr. 1992, pp. 977–985.

H. Ajer, et al., "Efficient Diode–Laser Side Pumped TEM$_{00}$–Mode Nd:YAG Laser," *Optics Letter*, vol. 17, No. 24, Dec. 15, 1992, pp. 1785–1787.

D. W. Hughes, et al., "Laser Diode Pumped Solid State Lasers," *J. Phys. D.: Appl. Phys.*, vol. 25, 1992, pp. 563–586.

W. Koechner: "Solid–State Engineering," Spinger Verlag Berlin Heidelberg, 1992, pp. 246–249.

Welford, et al., "Observation of Enhanced Therman Lensing Due to Near–Gaussian Pumped Deposition in a Laser–Diode Side–Pumped Nd:YAG Laser," *Journal of Quantum Electronics*, vol. 28. No. 4, Apr. 1992, pp. 1075–1080.

Choi, et al., "A Q–switched Laser Injection Seeded by a Ribidium Absorption Frequency Matched Diode Laser," *Optics Communications*, vol. 88, No. 4.4.5, Apr. 1, 1992, pp. 385–390.

Fix, et al., "Tunable β–barium Borate Optical Parametric Oscillator: Operating Characteristics with and without Injection Seedings,"*J. Opt. Soc. Am B.*, vol. 10, No. 9, Sep. 1993, pp. 1744–1750.

Rosenberg, et al., "Broadly Tunable, Single–Frequency Optical Parametric Frequency–Conversion System,"*J. Opt. Soc. AM B.*, vol. 10, No. 9, Sep. 1993, pp. 1716–1722.

A. W. Yu, et al., "1047 nm Laser Diode Master Oscillator Nd:YLF Power Amplifier Laser System," *Electronics Letters*, 1993, vol. 29, No. 8, pp. 678–679.

Company Literature of the Lightwave Electronics Corp., Technical Information: "Introduction to Diode–Pumped Solid State Lasers," 1993, pp. 1–16.

Advertising brochure: "SCANmate." Produced by Lambda Physik, printed Apr. 1994. 15 pages.

J. E. Bernard, et al., "High–Repetition–Rate–Didode–Pumped Nd: YV04 Slab Laser," *Opt. Lett.*, No. 15, 1994, vol. 19, No. 22, pp. 1861–1863.

S. A. Payne, et al., "Laser, Optical, and Thermomechanical Properties of Yb–doped Fluorapatite," *IEEE Journal of Quantum Electronics*, vol. 30, No. 1, Jan. 1994, pp. 170–179.

C.E. Hamilton, et al., "1–W Average Power Levels and Tunability From a Diode–Pumped 2.94 $\mu$m Er: YAG Oscillator," *Opt. Lett.*, Oct. 15, 1994, vol. 19, No. 20, pp. 1627–1629.

Walker, et al., "Efficient Continuous–Wave TEM$_{00}$ Operation of a Transversely Diode–Pumped Nd:YAG Laser," *Optics Letters*, vol. 19, No. 14, Jul. 15, 1994, pp. 1055–1057.

Selker, et al., "Efficient, Diode–Laser Pumped, Diode–Laser–Seeded, High–Peak–Powder Nd: YLF Regenerative Amplifier," *Optics Letters*, Apr. 15, 1994, vol. 198, No. 18, pp. 551–553.

B. Comaskey, et al., "24–W Average Power at 0.537 $\mu$m from an Externally Frequency–Doubled Q–Switched Diode–Pumped Nd:YOS Laser Oscillator," *Applied Optics*, vol. 33, No. 27, Sep. 20, 1994, pp. 6377–6382.

Knappe, et al., "Single–Mode Continuous–Wave Cr:LISAF Ring Laser Pumped by an Injection Locked 670–rm Broad Area Diode Laser," *Opt. Lett.*, 20m, 1995, PP. 1988–1990.

R. S. Afzal, et al., "Simple High–Efficiency TEM$_{00}$ Diode–Laser Pumped Q–Switched Laser," *Optics Letters*, vol. 20, No. 5, Mar. 1, 1995, pp. 465–467.

P. Peuser, et al., "Diodengepumpte Feskörperlaser," Springer–Verlag Berlin Heidelberg, 1995, book covcer and copyright pages, pp. 234–237, and pp. 313–314, (in German).

L. A. Rahn, "Feedback Stabilization of an Injection–Seeded Nd: YAG Laser," *Appl. Opt.*, 24, 990, 1985, pp. 940–942.

M. J. Johnson, et al., "Continuously Tunable Narrow–Band Operation of an Injection–Seeded Ring–Cavity Optical Parametric Oscillator: Spectroscopic Applications," *Optics Letters*, vol. 20, No. 11, Jun. 1, 1995, pp. 1277–1279.

J.M. Boon–Engering, et al., "Bandwidth Studies of an Injection–seeded β–barium Borate Optical Parametric Oscillator," *Optics Letters*, vol. 20, No. 4, Feb. 15, 1995, pp. 380–382.

T. D. Raymond, et al., "Two–Frequency Injection–Seeded Nd: YAG Laser," *IEEE Journal of Quantum Electronics*, Oct. 1995, vol. 31, No. 10, pp. 1734–1737.

V. Petrov. Et al., "Frequency Upconversion of Tunable Femtosecond Pulses by Parametric Amplification and Sum-frequency Generation in a Single Nonlinear Crystal," *Optics Letters*, vol. 20, No. 21, Nov. 1, 1995, pp. 2171–2173.

W. Koechner, *Solid–State Laser Engineering*, 3$^{rd}$ Completely Revised and Updated Edition, pp. 127–140, 709, (Springer series in Optical Sciences, v.1, Springer–Verlag, Berlin, Heidelberg, New York, 1996.

L. D. DeLoach, et al., "Transition Metal–Doped Zinc Chalcogenides: Spectroscopy and Laser Demonstration of a New Class of Gain Media," *IEEE Journal of Quantum Electronics*, Jun. 1996, vol. 32, No. 6, pp. 885–895.

N. J. Vasa, et al., "Comparative Study of Spectral Narrowing of a Pulsed Ti:Sapphire Laser Using Pulsed and CW Injection Seedings," *Applied Physics B*, vol. 62, 1996, pp. 51–57.

Goldberg, et al., V–Groove Side–Pumped 1.5$\mu$m Fibrre Amplifier, *Optics Letters*, vol. 33, No. 25, Dec. 4, 1997, pp. 2127–2129.

Fujikawa, et al., "High–Pwer High–Efficient Diode–Pumped Nd: YAG Laser," *Advanced Solid State Lasers, Optical Society of America*, Topical Meeting, Orlando Florida, Jan. 27–29, 1997, pp. 296–299.

A. Taguchi, et al., "Effects of Moisture on CLBO," *OSA Topics:, Advanced Solid State Lasers*, vol. 10, 1997, pp. 19–23.

Golla, et al., "Design and Operation of a 250 W cw, Diode–Laser Side–Pumped Nd:YAG Rod Laser,"3 pages.

Spec. Sheet: "CEO: High Performance Diode–Pumped Lasers" Published by Cutting Edge Optronics, Inc.; St. Charles, MO, U.S.A. Faxed stamped Aug. 17, 1999, 8 pages total.

Spec. Sheet: "CEO: High Performance Diode–Pumped Lasers: 100W CW Diode–Pumped Nd:YAG Rod Laser Systems" Published by Cutting Edge Optronics, Inc.; St. Charles, MO, U.S.A. 2 pages.

Spec. Sheet: DLS Diodengepumpter Nd: YAG–Laser, 30 Watt, published by LASAG AG, Switzerland, 2 pages.

* cited by examiner

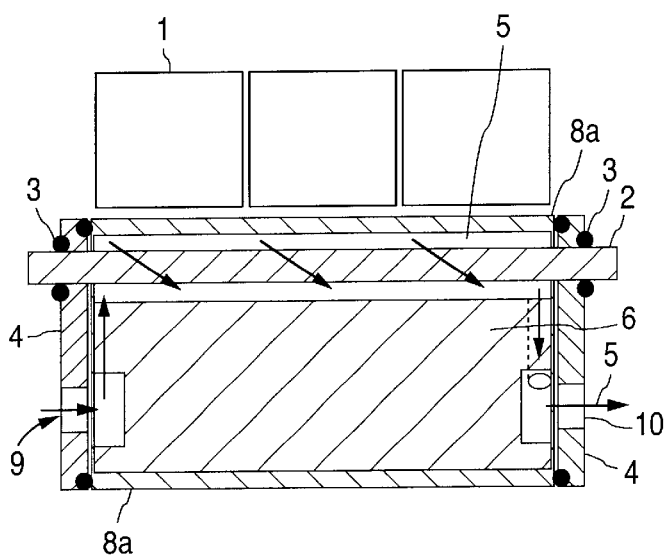
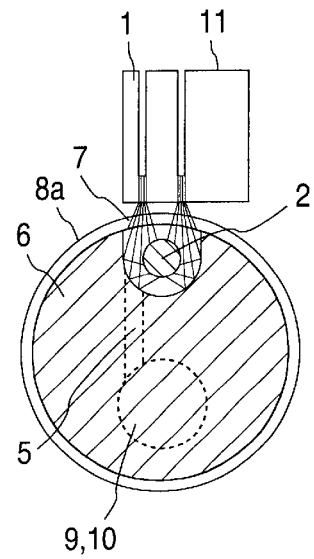
Figure 1a
Figure 1b
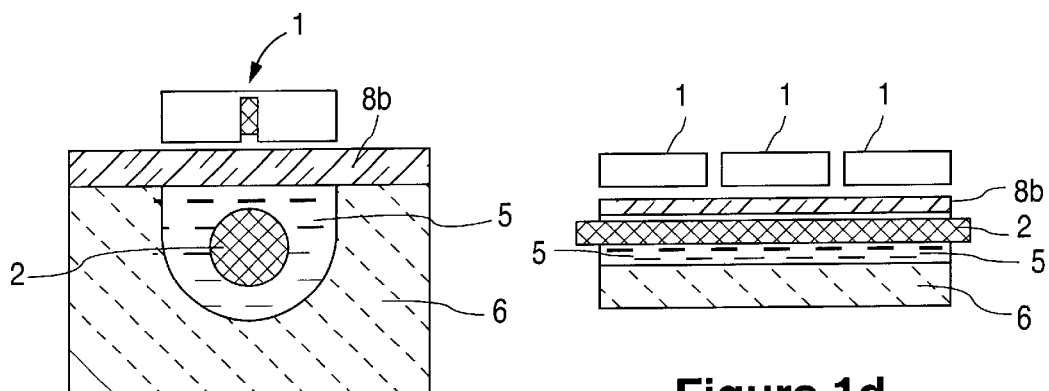
Figure 1c
Figure 1d

GAIN MODULE FOR DIODE-PUMPED SOLID STATE LASER AND AMPLIFIER

PRIORITY

This application claims the benefit of priority to United States provisional patent application no. 60/228,185, filed Aug. 25, 2000.

BACKGROUND OF THE INVENTION

1. Field of the Invention

The invention relates to solid state lasers, and particularly to a side-pumped, diode-pumped solid state laser which is side-pumped by a "semi-closely coupled" diode array.

2. Discussion of the Related Art

The side-pumped, diode-pumped solid state laser (side-pumped DPSSL) field can be divided into sub-fields based on how the otherwise highly divergent diode radiation is coupled into the laser rod. Some of these sub-fields would include: (a) using optics such as a cylindrical lens or elliptical mirror, (b) using an optical waveguide such as a reflective cavity or fiber; and (c) closely coupling the diode(s) to the rod. The invention according to the preferred embodiment would be most closely fit among these sub-fields into sub-field (c), although the diode array of the invention may be considered to be "semi-closely coupled" and thus not fit into any of the sub-fields (a)–(c), instead being in a new sub-field (d) of the side-pumped DPSSL field. Thus, the invention is considered to form a new sub-field relating to semi-closely coupled diode array side-pumping of solid state lasers.

Japanese patent no. JP 5-259540 discloses a side-pumped DPSSL wherein the rod is disposed within a diffuse reflector or condenser. A diode array emits radiation that enters the condenser for absorption by the rod via a narrow slit which guides the diode radiation toward the rod. A gel or liquid such as water surrounds the rod filling a spacing between the rod and a second solid state medium. The slit is quite narrow, e.g., on the order of the width of an active region of the laser diode, and the diode array is disposed right on the slit. The light emitted by the diode array undergoes several reflections from the walls defining the extent of the slit which reduces the efficiency of the device.

In the close-coupled arrangement described at U.S. Pat. No. 5,774,488, the rod is enclosed into a temperature conductive reflector, and the pump radiation is introduced through a narrow slit in the reflector. The problem with this embodiment is its complexity of manufacturing, since the rod must fit tightly into the metal reflector. Additionally, any difference in thermal expansion of the rod and reflector may cause mechanical stress. Also, pump radiation from the diode must pass through a long narrow slit (channel) in the metal reflector, thus suffering multiple reflections and, therefore, losses.

U.S. Pat. Nos. 5,521,936, 5,033,058, and 6,026,109 disclose water-cooled solid state lasers using closely coupled side-pumping diode arrays. The pumping laser diodes are disposed close to the rod in order that the rod remains in the path of the substantial portion of the divergent radiation, as it is not contemplated that rays missing the rod on the first pass will be subsequently redirected towards the rod to be absorbed on a second or later pass. U.S. Pat. No. 5,870,421 patent differs in that it discloses to use side-pumping optical fibers. Using optical fibers adds substantial manufacturing cost.

In addition, the alternative configurations described in U.S. Pat. Nos. 5,521,936, 5,033,058, and 6,026,109 include a rod which is cooled with a water jacket enclosed into a flow tube, with the diodes and reflector disposed outside the flow tube, similarly to JP 5-259540. Here, a disadvantage is that the wall thickness of the flow tube adds significant distance between the rod and reflector. In configurations using a diffuse reflector, this leads to increased losses of the pump light, resulting in reduced efficiency.

On the other hand, specular reflectors are not able to produce the same level of uniformity of the pump radiation as the diffuse reflectors. For example, Hanson, et al., citation below, disclose a three-bar diode array spaced somewhat from a large, approximately $\pi/2$ opening to a solid state laser cavity. Ajer et al., citation below, disclose a closely-coupled side-pumping diode array which pumps the rod through a slit-like opening. Each of the cavities disclosed by Hanson, et al. and Ajer, et al. include highly reflective inner surfaces, and the intensity distributions of the pumping diode radiation within the rods lack homogeneity.

Generally, pumping with a diode array from one direction can leads to a cylindrical intensity distribution (as shown, for example, in the paper by Hanson, et al.). This gives rise to a cylindrical thermal lens in the rod, which, in turn, results in an astigmatic output beam of the laser. This can be extremely disadvantageous in applications such as micro-machining of nozzles in car fuel injectors and ink-jet printers, where a hole roundness of better than a few percent is desired. To improve circularity, some of the mentioned above sources describe alternative arrangements which use pumping radiation from several (two or more) directions. The problem with this approach, however, is that laser diodes tend to age differently, which destroys the intensity balance over the lifetime of diodes. It is desired to have a pump chamber wherein the intensity distribution of the pump radiation inside the rod is uniformly distributed with substantially circular symmetry.

In addition to side-pumped solid-state lasers, there are numerous commercial lasers utilizing end-pumping. In such lasers, the radiation from the pump diodes is collinear or nearly collinear with the laser beam. An advantage of end pumping is its high efficiency, mainly due to the good spatial overlap of the pump beam with the generated laser beam. However, this configuration is limited to lower output power, typically around 10W or less. The reason for that is that the pump radiation is absorbed in a small volume which leads to significant thermo-optical distortions. On the other hand, side-pumping allows a distribution of pump energy over a longer active medium, thus increasing the pumped volume and allowing high scalability of the output power. It is recognized in the present invention that care should be taken to maintain a uniform distribution of the pump intensity in the gain volume, which is an object of the present invention.

The following summarizes the features of the desired configuration, as recognized in the present invention. First, the rod should be preferably cooled with water. Second, the reflector should be of diffuse type and placed close to the rod. Third, the pump radiation should come from one source, but still produce a circularly symmetrical intensity distribution inside the rod.

SUMMARY OF THE INVENTION

In view of the above, a side-pumped diode-pumped solid state laser device is provided including an elongated housing having an elongated cavity defined therein and further having an elongated opening defined between the cavity and the exterior of the housing, a solid state rod disposed within the cavity and surrounded by a cooling fluid, a cover seal outside the housing and sealably covering the opening and thereby enclosing the cavity, the cover seal being formed of a material that is at least substantially transparent to pumping radiation at a predetermined pumping wavelength, a diode array proximate to the cover seal for emitting the pumping radiation that traverses the cover seal and the opening to be absorbed by the rod to excite laser active species within the rod, and a resonator including the rod disposed therein for generating a laser beam.

A side-pumped diode-pumped solid state laser device is further provided including an elongated housing having an elongated cavity defined therein and further having an elongated opening defined between the cavity and the exterior of the housing, a solid state rod disposed within the cavity, a cover seal outside the housing and sealably covering the opening and thereby enclosing the cavity, the cover seal being formed of a material that is at least substantially transparent to pumping radiation at a predetermined pumping wavelength, a diode array proximate to the cover seal for emitting the pumping radiation that traverses the cover seal and the opening to be absorbed by the rod to excite laser active species within the rod, and a resonator including the rod disposed therein for generating a laser beam.

A side-pumped diode-pumped solid state laser device is also provided including an elongated housing having an elongated cavity defined therein and further having an elongated opening defined between the cavity and the exterior of the housing, the elongated opening having a radial extent defined from a center of the cavity of at least 30°, a solid state rod disposed within the cavity and surrounded by a cooling fluid, a cover seal sealably covering the opening and thereby enclosing the cavity, the cover seal being formed of a material that is at least substantially transparent to pumping radiation at a predetermined pumping wavelength, a diode array proximate to the cover seal for emitting the pumping radiation that traverses the cover seal and the opening to be absorbed by the rod to excite laser active species within the rod, and a resonator including the rod disposed therein for generating a laser beam.

A side-pumped diode-pumped solid state laser device is further provided including an elongated diffuse reflector housing having an elongated cavity defined therein by a diffusely reflective cavity wall, the housing further having an elongated opening defined between the cavity and the exterior of the housing, a solid state rod disposed within the cavity and surrounded by a cooling fluid, a cover seal sealably covering the opening and thereby enclosing the cavity, the cover seal being formed of a material that is at least substantially transparent to pumping radiation at a predetermined pumping wavelength, a diode array proximate to the cover seal for emitting the pumping radiation that traverses the cover seal and the opening to be absorbed by the rod to excite laser active species within the rod, wherein a substantial portion of the pumping radiation absorbed by the rod is first reflected from the diffuse reflector housing, and a resonator including the rod disposed therein for generating a laser beam.

A side-pumped diode-pumped solid state laser device is further provided including an elongated diffuse reflector housing having an elongated cavity defined therein by a diffusely reflective cavity wall, the housing further having an elongated opening defined between the cavity and the exterior of the housing, a solid state rod disposed within the cavity and surrounded by a cooling fluid flowing along the rod for cooling the rod, a cover seal sealably covering the opening and thereby enclosing the cavity, the cover seal being formed of a material that is at least substantially transparent to pumping radiation at a predetermined pumping wavelength, a diode array proximate to the cover seal for emitting the pumping radiation that traverses the cover seal and the opening to be absorbed by the rod to excite laser active species within the rod, and a resonator including the rod disposed therein for generating a laser beam.

A side-pumped diode-pumped solid state laser device is also provided including an elongated diffuse reflector housing having an elongated cavity defined therein by a diffusely reflective cavity wall, the housing further having an elongated opening defined between the cavity and the exterior of the housing, a solid state rod disposed within the cavity and surrounded by a cooling fluid contacting the rod for cooling the rod, a cover seal sealably covering the opening and thereby enclosing the cavity, the cover seal being formed of a material that is at least substantially transparent to pumping radiation at a predetermined pumping wavelength, a diode array proximate to the cover seal for emitting the pumping radiation that traverses the cover seal and the opening to be absorbed by the rod to excite laser active species within the rod, and a resonator including the rod disposed therein for generating a laser beam.

A side-pumped diode-pumped solid state laser device is also provided including an elongated housing having an elongated cavity defined therein and further having an elongated opening defined between the cavity and the exterior of the housing, the elongated opening having a radial extent defined from a center of the cavity of at least 30°, a solid state rod disposed within the cavity and surrounded by a cooling fluid, a cover seal sealably covering the opening and thereby enclosing the cavity, the cover seal being formed of a material that is at least substantially transparent to pumping radiation at a predetermined pumping wavelength, a diode array for emitting the pumping radiation that traverses the cover seal and the opening to be absorbed by the rod to excite laser active species within the rod, and a resonator including the rod disposed therein for generating a laser beam.

BRIEF DESCRIPTION OF THE DRAWINGS

FIG. 1a schematically illustrates a side view of a side-pumped DPSSL according to a first preferred embodiment.

FIG. 1b schematically illustrates a cross-sectional front view of the side-pumped DPSSL of FIG. 1a.

FIG. 1c schematically illustrates a cross-sectional front view of the side-pumped DPSSL of FIGS. 1a and 1b and further illustrating a cover seal enclosing the cavity.

FIG. 1d schematically illustrates a side view of the side-pumped DPSSL of FIG. 1d.

FIG. 2b schematically illustrates a cross-sectional front view of the side-pumped DPSSL of FIG. 2a.

FIG. 3b schematically illustrates a cross-sectional front view of the side-pumped DPSSL of FIG. 3a.

INCORPORATION BY REFERENCE

Figure 2A:
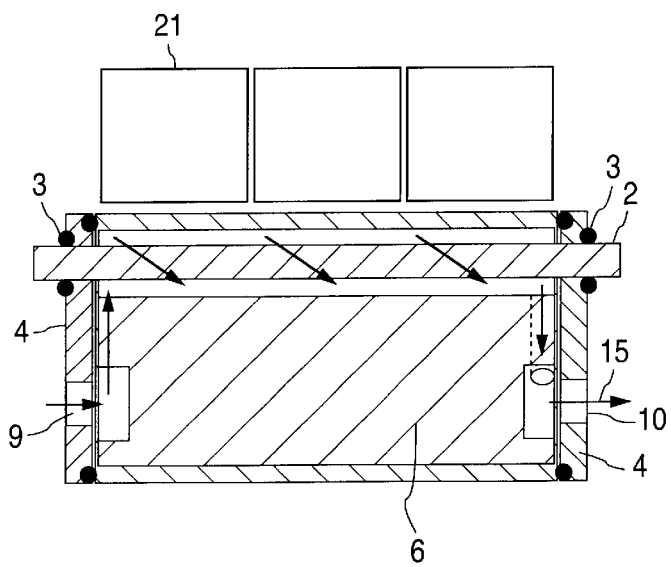
FIG. 2a schematically illustrates a side view of a side-pumped DPSSL according to a second preferred embodiment.

What follows is a cite list of references which are, in addition to any references cited above in the background section or below in the detailed description of the preferred embodiments, and the background section itself, hereby incorporated by reference into the detailed description of the preferred embodiments below, as disclosing alternative embodiments of elements or features of the preferred embodiments not otherwise set forth in detail below. A single one or a combination of two or more of these references may be consulted to obtain a variation of the preferred embodiments described in the detailed description below. Further patent, patent application and non-patent references are cited in the written description and are also incorporated by reference into the preferred embodiment with the same effect as just described with respect to the following references:

Walter Koechner, "Solid State Laser Engineering", pp. 127–140, 709 (Springer series in optical sciences, v.1, Springer-Verlag, Berlin, Heidelberg, New York, 1996);

Frank Hanson and Delmar Haddock, "Laser diode side pumping of neodymium laser rods", Applied Optics, vol. 27, no. 1, 1988, pp. 80–83;

H. Ajer, et al., "Efficient diode-laser side-pumped TEM00-mode Nd:YAG laser", Optics Letters, vol. 17, no. 24, 1992, pp. 1785–1787;

Jeffrey J. Kasinski, et al., "One Joule Output From a Diode Array Pumped Nd:YAG Laser with Side Pumped Rod Geometry", J. of Quantum Electronics, Vol. 28, No. 4 (April 1992);

D. Golla, et al., "300-W cw Diode Laser Side Pumped Nd:YAG Rod Laser", Optics Letters, Vol. 20, No. 10 (May 15, 1995)

Japanese patent no. JP 5-259540;

U.S. Pat. Nos. 5,774,488, 5,521,936, 5,033,058, 6,026,109, 5,870,421, 5,117,436, 5,572,541, 5,140,607, 4,945,544, 5,875,206, 5,590,147, 3,683,296, 3,684,980, 3,821,663, 5,084,886, 5,661,738, 5,867,324, 5,963,363, 5,978,407, 5,661,738, 4,794,615, 5,623,510, 5,623,510, 3,222,615, 3,140,451, 3,663,893, 4,756,002, 4,794,615, 4,872,177, 5,050,173, 5,349,600, 5,455,838, 5,488,626, 5,521,932, 5,590,147, 5,627,848, 5,627,850, 5,638,388, 5,651,020, 5,838,712, 5,875,206, 5,677,920, 5,905,745, 5,909,306, 5,930,030, 5,987,049, 5,995,523, 6,009,114, and 6,002,695;

German patent no. DE 689 15 421 T2;

Canadian patent no. 1,303,198;

French Patents no. 1,379,289 and 2,592,530;

Fujikawa, et al., "High-Power High-Efficient Diode-Side-Pumped Nd:YAG Laser", Trends in Optics and Photonics, TOPS Volume X, Advanced Solid State Lasers, Pollock and Bosenberg, eds., (Topical Meeting, Orlando, Fla., Jan. 27–29, 1997);

R. V. Pole, IBM Technical Disclosure Bulletin, "Active Optical Imaging System", Vol. 7, No. 12 (May 1965);

Devlin, et al., "Composite Rod Optical Masers", Applied Optics, Vol. 1, No. 1 (January 1962);

Goldberg et al., "V-groove side-pumped 1.5 $\mu$m fibre amplifier," Electronics Letters, Vol. 33, No. 25, Dec. 4, 1997);

Welford, et al., "Efficient $TEM_{00}$-mode operation of a laser didoe side-pumped Nd:YAG laser, Optics Letters, Vol. 16, No. 23 (Dec. 1, 1991);

Welford, et al., "Observation of Enhanced Thermal Lensing Due to Near-Gaussian Pump Energy Deposition in a Laser Diode Side-Pumped Nd:YAG Laser," IEEE Journal of Quantum Electronics, Vol. 28, No. 4 (Apr. 4, 1992);

Walker, et al., "Efficient continuous-wave $TEM_{00}$ operation of a transversely diode-pumped Nd:YAG laser," Optics Letters, Vol. 19, No. 14 (Jul. 15, 1994); and Comaskey et al., "24-W average power at 0.537 $\mu$m from an externally frequency-doubled Q-switched diode-pumped ND:YOS laser oscillator," Applied Optics, Vol. 33, No. 27 (Sep. 20, 1994).

DETAILED DESCRIPTION OF THE PREFERRED EMBODIMENTS

The preferred embodiments described below set forth pump cells for a diode-pumped solid state laser or amplifier. Advantages of the cell include its high efficiency, power scalability, simplicity, and stability of the cross-sectional distribution of the gain over the lifetime of the pump diodes. The diode pumped solid state laser device is side pumped and generally includes an elongated cylindrical cavity having an opening in the elongated direction. A solid state rod surrounded by a cooling fluid is disposed within the cavity. A cover seal covers the opening and encloses the cavity, and is formed of a material that is at least substantially transparent to radiation at a predetermined pumping wavelength. A diode array emits the pumping radiation that traverses the cover glass and the opening to be absorbed by the rod to excite laser active species within the rod. A resonator is provided that surrounds the rod for generating a laser beam.

FIGS. 1a and 1b schematically illustrate a side view and a cross-sectional front view, respectively, of a side-pumped DPSSL according to a first preferred embodiment. Referring to FIGS. 1a and 1b, diode arrays 1 are shown disposed on one side of the solid state laser (e.g., Nd:YAG) rod 2. The rod 2 is sealed by seals 3 within a housing 4 at each end of the rod 2 in its elongated direction, as shown. The rod 2 is surrounded by a cooling fluid 5 such as water and is centered within a cavity defined within a diffusive ceramic reflecting material 6. As shown in FIG. 1b, pumping radiation 7 enters the cavity through an opening in the material 6 leading to the rod 2 through a cover seal 8a, wherein the opening is preferably elongated along the extent of the elongated direction of the rod 2. The opening shown has an approximately 90° radial extent for exposing the cavity to the pumping radiation 7. The elongated opening may be smaller, e.g., 60°, 45°, 30°, or even somewhat smaller than 30°, or may be larger than 90°, in alternative embodiments. A spacing between the rod 2 and the walls of the diffusely reflecting material 6 defining the reflecting cavity allows a flow of the cooling water 5.

Referring now to FIGS. 1c and 1d, a cover seal 8b is shown which is at least substantially transparent to radiation emitted from the pumping diode array 1. The cover seal 8b preferably includes a glass plate sealably enclosing the cavity, wherein the cover seal 8a of the embodiment shown in FIG. 1b is, in contrast, preferably a cylindrical tube. The cover seal 8b allows the opening to be wide, e.g, 90°, for the diffuse, highly divergent diode source radiation to enter the cavity, such that the diode array is only shown to be semi-closely coupled to the opening through the cover seal 8b. A preferably single or double bar diode array 1 (as shown in FIG. 1b) for radiative side-pumping of the rod 2 is disposed just outside the transparent cover seal 8b, and is thus separated from the rod 2 by the cooling fluid 5 and the transparent plate 8b. FIG. 1d shows three diode arrays 1 arranged end to end for illuminating substantially the entire elongated extend of the rod 2.

Referring specifically to FIG. 1b, a double bar diode array 1 provides pumping radiation from each bar of the diode array on either side of the center of the rod 2. A substantial portion of the pumping radiation 7 reflects from the walls of the diffuse reflector 6 defining the cavity prior to being absorbed by the rod 2. This feature permits an advantageously uniform illumination of the rod 2 in accordance with the object of the invention.

The first preferred embodiment schematically illustrated at FIGS. 1a–1d uses the diffuse reflector 6 immersed into cooling water 5 which is flowing along the rod 2. Referring again to FIG. 1a, the cooling water 5 flows into the cavity through an opening 9 in the housing 4. The cooling water 5 flows into the elongated cavity within which the rod 2 is disposed and flows along the rod 2 preferably contacting the rod 2, wherein a separate cooling water enclosure for containing the cooling water 5 is not used. Instead, the cooling water is contained by the cavity walls of the diffuse reflector 6 and the cover seal 8a. The cooling water then flows out of the housing through another opening 10. This feature advantageously allows a reduction of the distance between the rod 2 and walls of the diffuse reflector 6 compared with systems utilizing a separate cooling water containing enclosure. A reduced thickness of the water jacket 5 is thus used which still provides sufficient cooling of the rod 2.

As mentioned, the water jacket 5 is sealed with the preferably thin cover glass 8b, which may be shaped as a plate, as shown in FIGS. 1c and 1d, or alternatively with the thin cylindrical tube 8a of relatively large diameter such as is illustrated at FIG. 1b. The choice between these two configurations is dictated by convenience of sealing the cell at the ends of the rod 2, given the limited spacing between the rod 2 and cover seal 8a or 8b, and the limited length of the rod 2. The fact that the wall of the diffuse reflector 6 defining the cavity is close to the rod 2, provides for a nearly uniform pump intensity distribution, even when pumping with a single-bar diode array 1.

Several arrays 1 can be disposed along the rod 2, e.g. three as shown in FIG. 1d, in order to increase the gain medium's length. Furthermore, one can use double-bar stacked arrays (or triple- or more) in order to increase pump power and provide even more uniform intensity inside the rod, as shown in FIG. 1b. Here, a non-uniform aging of the diodes is not a big concern compared with systems having multiple arrays spaced around the rod 2, because both bars of the array shown at FIG. 1b are mounted close to each other on a common heat sink 11 and, therefore, their aging conditions (temperature and electric current) are similar. For the reasons of higher power and uniformity, this embodiment is advantageous. The use of stacked two- or multiple-bar arrays becomes possible due to the fact that the pump light enters the reflector cavity through a wide opening, as opposed to a narrow slit.

Figure 2B:
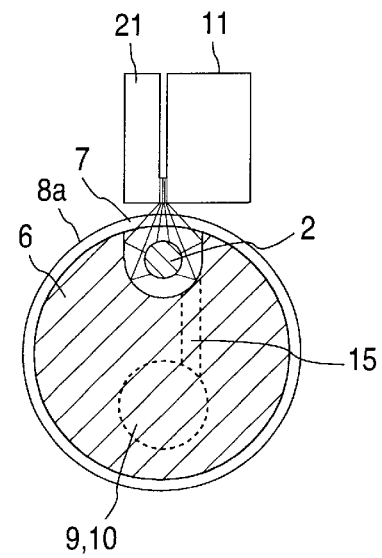

FIGS. 2a and 2b schematically illustrate a side view and a cross-sectional front view, respectively, of a side-pumped DPSSL according to a second preferred embodiment. The second embodiment is substantial the same as the first embodiment and a description of same or similar features according to the above description is incorporated here and not repeated. FIG. 2b illustrates the differences between the first and second embodiments. First, the cooling water flow 15 is moved to the right of the rod 2 in the cavity in FIG. 2b compared with that of FIG. 1b. This illustrates that the particular configuration of the flow path of the water 15 may be modified. For example, the flow path of the water 15 may be moved towards the center of the cavity, as well. A second difference between the first and second embodiments is that the diode array 21 of the second embodiment is a single bar array 21, compared with the double bar array 1 of the first embodiment. As mentioned, three of more bars may also be used in alternatively embodiments, wherein such alternative configuration might be used for inserting additional pumping radiation power into the cavity.

Figure 3A:
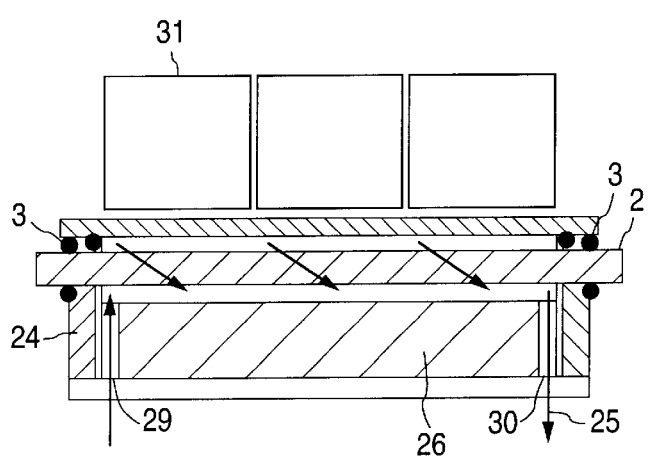
FIG. 3a schematically illustrates a side view of a side-pumped DPSSL according to a third preferred embodiment.
Figure 3B:
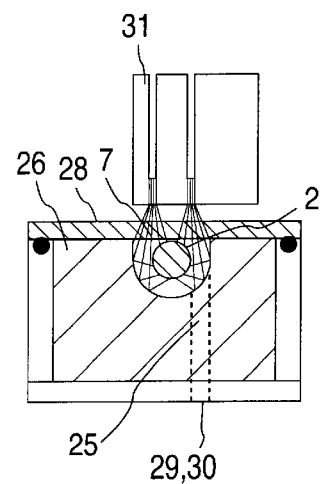

FIGS. 3a and 3b schematically illustrate a side view and a cross-sectional front view, respectively, of a side-pumped DPSSL according to a third preferred embodiment. In the third embodiment, the housing 24 is rectangularly-shaped. The rectangular housing easily accomodates the cover seal 28 which is preferably a plate 28 in the third embodiment. The diffuse reflector material 26 is also rectangularly shaped in conformance to the rectangular housing 24 within which the material 26 is disposed. Although the cooling water 25 may enter the housing 24 from the front and rear such as in the first and second embodiments, the water 25 enters from a bottom opening 29 and exits from another bottom opening 30, as shown (or alternatively the top or sides) in the third embodiment as shown in FIG. 3a. This illustrates that in any of the embodiments herein, the water 5, 15, 25 may enter from a variety of positions relative to the housing 6, 26. The diode array 31 is shown in FIG. 3b as being a double bar array and the cooling water 25 is shown flowing from the right relative to the bar 2 in FIG. 3b. The diode array 31 may be a single, triple or other multiple bar array, as well, and the cooling water 25 may flow from a variety of positions relative to the rod 2, as discussed above with reference to FIGS. 2a and 2b.

An advantage of having a wide opening in the reflecting cavity is that this allows use of the cover seal 8a or 8b to seal the water channel, since the pump diode source is outside the cover seal 8a or 8b and, therefore, the pump radiation 7 travels a distance of the order of a millimeter or so before reaching the rod 2. Due to the high divergency of the laser diode output beam 7, the beam size becomes comparable to the diameter of the rod 2 (on the order of one or few millimeters) when it enters the reflecting cavity. A further advantage is that imaging optics (e.g., a cylindrical lens) are not used and insertion losses resulting from use of such optics is avoided.

As mentioned, the pumping chamber, or cavity defined in the reflector 6, includes the laser gain medium which is shaped as a rod 2. Some examples of the gain medium are neodymium doped YAG ($Y_3Al_5O_{12}$), yttrium orthovanadate ($YVO_4$), YLF ($LiYF_4$), and ytterbium-doped YAG. There are also many more less commonly used gain materials of solid state lasers known in the art which can be used in the preferred embodiments.

The material of the diffuse reflector is preferably ceramic, such as alumina ($Al_2O_3$) ceramic, although other kinds of ceramic or organic materials with high reflectivity at the pump wavelength (e.g., 808 nm) and diffuse reflection can be used (e.g., Spectralon™). Also, various grades of ceramic with higher or lower porosity are known in the art to produce varying reflection characteristics in terms of scattering angle distribution, and any of various porosities may be selected for use with any of the emboidments herein. If the reflector material 6, 26 is selected to be made of highly porous ceramic, it is preferred to glaze at least the channel area, so as to increase the durability of the reflection properties and resistance to contaminants in cooling water 5, 15, 25.

Figure 4:
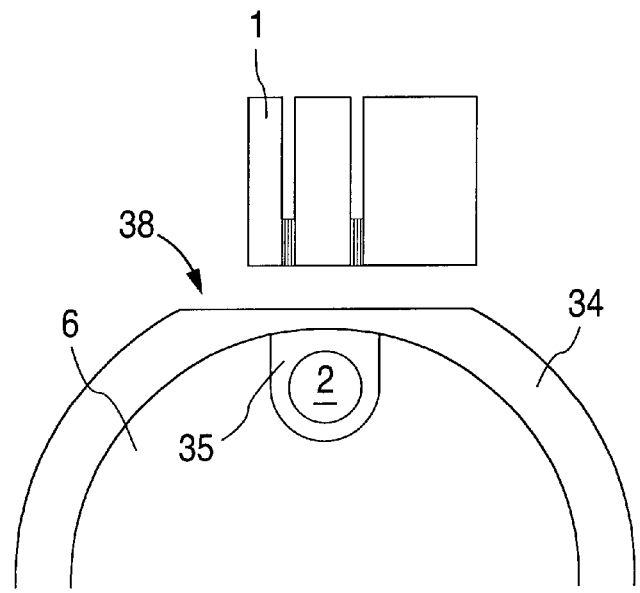
FIG. 4 schematically illustrates a cross-sectional front view of a side-pumped DPSSL according to a fourth preferred embodiment.

In addition, the surfaces of the cover seal 8a, 8b, 28 transmitting the pump radiation should be preferably anti-reflectively coated so as to reduce reflection losses of the pump radiation. In the cross-sectional front views of the first and second embodiments schematically illustrated at FIGS. 1b and 2b, respectively, a tubular cover glass 8a is used. Referring now to a fourth embodiment schematically illustrated at FIG. 4, a tubular cover seal 34 may have a flat segment 38 machined on the side facing the diodes 1. This feature reduces the focusing action of the otherwise cylindrical surface of the tube 34. The flat segment 38 specifications may be varied according to the thickness of the tube 34, the water jacket 35 and the diameter of the rod 2.

Figure 5:
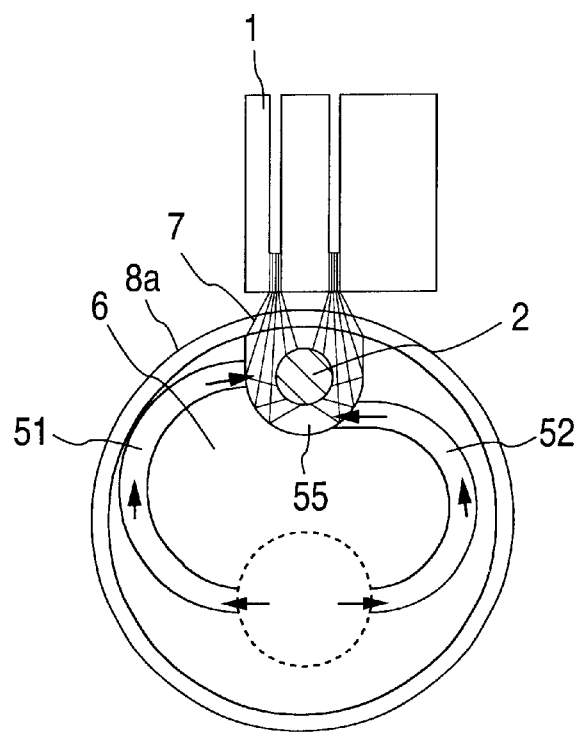
FIG. 5 schematically illustrates a cross-sectional front view of a side-pumped DPSSL according to a fifth preferred embodiment.

Another consideration is the water flow pattern in the water jacket 5, 15, 25. In order to provide a uniform temperature distribution on the surface of the rod 2, it is preferred to create a "swirl" pattern. Here, the water path is a spiral wrapped around the rod 2, which ensures that each side of the rod has substantially equal cooling conditions. This, in turn, advantageously provides a circular symmetry of the thermal lens in the rod 2. One possible way of creating such pattern is to input and output water flow into and out of the space surrounding the rod through a pair of channels that are offset from the center of the rod, as shown in FIGS. 1b, 2b and 3b, and placed on the opposite sides of the rod 2. Another possible configuration is schematically illustrated at FIG. 5 as a fifth embodiment. In the embodiment of FIG. 5, there are at least two input water channels 51 and 52, as shown, and correspondingly preferably at least two output channels (not shown). This feature provides a water flow 55 that includes substantially no stagnant areas in the water jacket 55.

In brief summary, the rod 2 is centered within the diffusive reflective cavity having a large elongated opening, e.g., approximately 90°, although as mentioned, the extent of the opening may be modified according to specific design considerations. A spacing between the rod 2 and the walls of the reflecting cavity allows the flow of cooling water 5, 15, 25, 35, 55. A cover seal 8a, 8b, 28, 38 such as a tube 8a, a plate 8b or flattened segment 38 or a tube 34, transparent to radiation emitted from a pumping diode array 1, 21, 31, sealably encloses the cavity, and thus a wide opening is provided for the divergent diode source radiation to enter the cavity, such that the diode arrays 1, 21, 31 may be semi-closely coupled to the opening through the cover seal 8a, 8b, 28, 38 in contrast to closely-coupled systems. A collimating lens or reflective slit may thus not be used, which tend to be lossy and hard to manufacture. The single or multiple-bar diode array 1, 11, 31 for radiative side-pumping of the rod 2 is disposed just outside the transparent cover seal 8a, 8b, 28, 38, and is thus separated from the rod 2 by the cooling fluid jacket 5, 15, 25, 35, 55 and the transparent seal 8a, 8b, 28, 38.

Some advantages of the preferred embodiments include the following. First, the reflecting cavity is immersed into the cooling agent (e.g., water), thus allowing the cavity walls to be disposed close to the surface of the laser rod 2. Second, the reflecting material 6, 26 is diffusive, such as providing a uniform illumination of the rod 2 by pumping radiation 7 having a substantial portion that reflects from the cavity walls defined in the reflector 6, 26 prior to being absorbed in the rod 2. Third, the reflector material 6, 26 includes a relatively large opening, compared to narrow slit systems, which allows the entrance of the pump radiation 7 from a single diode bar 21 or multiple diode laser bars 1, 31, placed at a considerable distance (e.g., 0.5 mm or more) from the rod 2, while still not using a collimating lens or reflective slit. The presence of the relatively large opening thus has at least two benefits, i.e., it allows the reflector chamber or cavity to be sealed with the cover seal 8a, 8b, 28, 38, which, in turn, permits the reflecting material to be immersed in the cooling agent 5, 15, 25, 35, 55 and to be disposed close to the rod 2, and it allows the use of stacked multiple-bar arrays (e.g., 1, 31) of pump laser diodes.

While exemplary drawings and specific embodiments of the present invention have been described and illustrated, it is to be understood that that the scope of the present invention is not to be limited to the particular embodiments discussed. Thus, the embodiments shall be regarded as illustrative rather than restrictive, and it should be understood that variations may be made in those embodiments by workers skilled in the arts without departing from the scope of the present invention as set forth in the claims that follow, and equivalents thereof.

What is claimed is:

1. A side pumped diode-pumped solid state laser device, comprising:

a diffuse reflector material forming an elongated structure having an elongated cavity defined therein and further having an elongated opening defined between the cavity and an exterior of the elongated structure;

a solid state rod disposed within the cavity and surrounded by a cooling fluid;

a cover seal outside the elongated structure and sealably covering the opening and thereby enclosing the cavity, the cover seal being formed of a material that is at least substantially transparent to pumping radiation at a predetermined pumping wavelength;

a diode array proximate to the cover seal for emitting the pumping radiation that traverses the cover seal an the opening to be absorbed by the rod to excite laser active species within the rod; and a resonator including the rod disposed therein for generating a laser beam.

2. The laser device of claim 1, wherein the elongated opening has a radial extent defined from a center of the cavity of at least 30°.

3. The laser device of claim 1, wherein the elongated opening has a radial extent defined from a center of the cavity of at least 45°.

4. The laser device of claim 1, wherein the elongated opening has a radial extent defined from a center of the cavity of at least 60°.

5. The laser device of claim 1, wherein the elongated opening has a radial extent defined from a center of the cavity of at least 90°.

6. The laser device of claim 1, wherein a portion of the pumping radiation absorbed by the rod is first reflected from the diffuse reflector material.

7. The laser device of claim 6, wherein said portion is more than 50%.

8. The laser device of claim 1, wherein the cooling fluid is flowing along the rod for cooling the rod.

9. The laser device of claim 1, wherein the cover seal is formed of glass.

10. The laser device of claim 9, wherein the glass cover seal is configured as a glass plate.

11. The laser device of claim 1, wherein the cover seal is configured as a plate including at least one substantially flat surface.

12. The laser device of claim 1, wherein said elongated cavity is substantially cylindrically shaped.

13. A side-pumped diode-pumped solid state laser device, comprising:

a diffuse reflector material forming an elongated structure having an elongated cavity defined therein and further having an elongated opening defined between the cavity and an exterior of the elongated structure;

a solid state rod disposed within the cavity;

a cover seal outside the elongated structure and sealably covering the opening and thereby enclosing the cavity the cover seal being formed of a material that is at least substantially transparent to pumping radiation at a predetermined pumping wavelength;

a diode array for emitting the pumping radiation that traverses the cover seal and the opening to be absorbed by the rod to excite laser active species within the rod; and a resonator including the rod disposed therein for generating a laser beam.

14. The laser device of claim 13, wherein the elongated opening has a radial extent defined from a center of the cavity of at least 30°.

15. The laser device of claim 13, wherein the elongated opening has a radial extent defined from a center of the cavity of at least 45°.

16. The laser device of claim 13, wherein the elongated opening has a radial extent defined from a center of the cavity of at least 60°.

17. The laser device of claim 13, wherein the elongated opening has a radial extent defined from a center of the cavity of at least 90°.

18. The laser device of claim 13, wherein a portion of the pumping radiation absorbed by the rod is first reflected from the diffuse reflector material.

19. The laser device of claim 18, wherein said portion is more than 50%.

20. The laser device of claim 13, wherein the cooling fluid is flowing along the rod for cooling the rod.

21. The laser device of claim 13, wherein the cover seal is formed of glass.

22. The laser device of claim 21, wherein the glass cover seal is configured as a glass plate.

23. The laser device of claim 13, wherein the cover seal is configured as a plate.

24. The laser device of claim 13, wherein said elongated cavity is substantially cylindrically shaped.

25. A side-pumped diode-pumped solid state laser device, comprising:

a diffuse reflector ceramic material forming an elongated structure having an elongated cavity defined therein and further having an elongated opening defined between the cavity and the exterior of the elongated structure, the elongated opening having a radial extent defined from a center of the cavity of at least 30°;

a solid state rod disposed within the cavity and surrounded by a cooling fluid;

a cover seal sealably covering the opening and thereby enclosing the cavity, the cover seal being formed of material that is at least substantially transparent to pumping radiation at a predetermined pumping wavelength;

a diode array for emitting the pumping radiation that traverses the cover seal and the opening to be absorbed by the rod to excite laser active species within the rod; and a resonator including the rod disposed therein for generating a laser beam.

26. The laser device of claim 25, wherein the elongated opening has a radial extent defined from a center of the cavity of at least 45°.

27. The laser device of claim 25, wherein the elongated opening has a radial extent defined from a center of the cavity of at least 60°.

28. The laser device of claim 25, wherein the elongated opening has a radial extent defined from a center of the cavity of at least 90°.

29. The laser device of claim 25, wherein a portion of the pumping radiation absorbed by the rod is first reflected from the diffuse reflector.

30. The laser device of claim 29, wherein said portion is more than 50%.

31. The laser device of claim 25, wherein the cooling fluid is flowing along the rod for cooling the rod.

32. The laser device of claim 25, wherein the cover seal is formed of glass.

33. The laser device of claim 32, wherein the glass cover seal is configured as a glass plate.

34. The laser device of claim 25, wherein the cover seal is configured as a plate.

35. The laser device of claim 25, wherein said elongated cavity is substantially cylindrically shaped.

36. A side-pumped diode-pumped solid state laser device, comprising:

an elongated diffuse reflector forming a structure having an elongated cavity defined therein by a diffusely reflective cavity wall, the structure further having an elongated opening defined between the cavity and the exterior of the structure;

a solid state rod disposed within the cavity and surrounded by a cooling fluid;

a cover seal sealably covering the opening and thereby enclosing the cavity, the cover seal being formed of material that is at least substantially transparent to pumping radiation at a predetermined pumping wavelength;

a diode array for emitting the pumping radiation that traverses the cover seal and the opening to be absorbed by the rod to excite laser active species within the rod, wherein a portion of the pumping radiation absorbed by the rod is first reflected from the diffuse reflector structure; and a resonator including the rod disposed therein for generating a laser beam.

37. The laser device of claim 36, wherein the elongated opening has a radial extent defined from a center of the cavity of at least 30°.

38. The laser device of claim 36, wherein the elongated opening has a radial extent defined from a center of the cavity of at least 45°.

39. The laser device of claim 36, wherein the elongated opening has a radial extent defined from a center of the cavity of at least 60°.

40. The laser device of claim 36, wherein the elongated opening has a radial extent defined from a center of the cavity of at least 90°.

41. The laser device of claim 36, wherein said portion of the pumping radiation absorbed by the rod which is reflected from the diffuse reflector structure is more than 50% of a total radiation absorbed by the rod.

42. The laser device of claim 36, wherein the cooling fluid is flowing along the rod for cooling the rod.

43. The laser device of claim 36, wherein the cover seal is formed of glass.

44. The laser device of claim 43, wherein the glass cover seal is configured as a glass plate.

45. The laser device of claim 36, wherein the cover seal is configured as a plate.

46. The laser device of claim 36, wherein said elongated cavity is substantially cylindrically shaped.

47. A side-pumped diode-pumped solid state laser device, comprising:

an elongated diffuse reflector structure having an elongated cavity defined therein by a diffusely reflective cavity wall, the structure further having an elongated opening defined between the cavity and the exterior of the structure;

a solid state rod disposed within the cavity and surrounded by a cooling fluid flowing along the rod for cooling the rod;

a cover seal sealably covering the opening and thereby enclosing the cavity, the cover seal being formed of material that is at least substantially transparent to pumping radiation at a predetermined pumping wavelength;

a diode array for emitting the pumping radiation that traverses the cover seal and the opening to be absorbed by the rod to excite laser active species within the rod; and a resonator including the rod disposed therein for generating a laser beam.

48. The laser device of claim 47, wherein the elongated opening has a radial extent defined from a center of the cavity of at least 30°.

49. The laser device of claim 47, wherein the elongated opening has a radial extent defined from a center of the cavity of at least 45°.

50. The laser device of claim 47, wherein the elongated opening has a radial extent defined from a center of the cavity of at least 60°.

51. The laser device of claim 47, wherein the elongated opening has a radial extent defined from a center of the cavity of at least 90°.

52. The laser device of claim 47, wherein more than 50% of the pumping radiation absorbed by the rod is first reflected by the diffuse reflector structure.

53. The laser device of claim 47, wherein the cover seal is formed of glass.

54. The laser device of claim 53, wherein the glass cover seal is configured as a glass plate.

55. The laser device of claim 47, wherein the cover seal is configured as a plate.

56. The laser device of claim 47, wherein said elongated cavity is substantially cylindrically shaped.

57. A side-pumped diode-pumped solid state laser device, comprising:

an elongated diffuse reflector structure having an elongated cavity defined therein by a diffusely reflective cavity wall, the structure further having an elongated opening defined between the cavity and the exterior of the structure;

a solid state rod disposed within the cavity and surrounded by a cooling fluid contacting the rod for cooling the rod;

a cover seal sealably covering the opening and thereby enclosing the cavity, the cover seal being formed of material that is at least substantially transparent to pumping radiation at a predetermined pumping wavelength;

a diode array for emitting the pumping radiation that traverses the cover seal and the opening to be absorbed by the rod to excite laser active species within the rod; and a resonator including the rod disposed therein for generating a laser beam.

58. The laser device of claim 57, wherein the elongated opening has a radial extent defined from a center of the cavity of at least 30°.

59. The laser device of claim 57, wherein the elongated opening has a radial extent defined from a center of the cavity of at least 45°.

60. The laser device of claim 57, wherein the elongated opening has a radial extent defined from a center of the cavity of at least 60°.

61. The laser device of claim 57, wherein the elongated opening has a radial extent defined from a center of the cavity of at least 90°.

62. The laser device of claim 57, wherein more than 50% of the pumping radiation absorbed by the rod is first reflected by the diffuse reflector structure.

63. The laser device of claim 57, wherein the cover seal is formed of glass.

64. The laser device of claim 63, wherein the glass cover seal is configured as a glass plate.

65. The laser device of claim 57, wherein the cover seal is configured as a plate.

66. The laser device of claim 57, wherein said elongated cavity is substantially cylindrically shaped.

67. A side-pumped diode-pumped solid state laser device, comprising:

a diffuse reflector material forming an elongated structure having an elongated cavity defined therein and further having an elongated opening defined between the cavity and the exterior of the elongated structure, the elongated opening having a radial extent defined from a center of the cavity of at least 30°;

a solid state rod disposed within the cavity and surrounded by a cooling fluid;

a cover seal sealably covering the opening and thereby enclosing the cavity, the cover seal being formed of material that is at least substantially transparent to pumping radiation at a predetermine pumping wavelength;

a diode array for emitting the pumping radiation that traverses the cover seal and the opening to be absorbed by the rod to excite laser active species within the rod; and a resonator including the rod disposed therein for generating a laser beam.

68. The laser device of claim 67, wherein the elongated opening has a radial extent defined from a center of the cavity of at least 45°.

69. The laser device of claim 67, wherein the elongated opening has a radial extent defined from a center of the cavity of at least 60°.

70. The laser device of claim 67, wherein the elongated opening has a radial extent defined from a center of the cavity of at least 90°.

71. The laser device of claim 67, wherein a portion of the pumping absorbed by the rod is first reflected from the diffuse reflector.

72. The laser device of claim 71, wherein said portion is more than 50%.

73. The laser device of claim 67, wherein the cooling fluid is flowing along the rod for cooling the rod.

74. The laser device of claim 67, wherein the cover seal is formed of glass.

75. The laser device of claim 74, wherein the glass cover seal is configured as a glass plate.

76. The laser device of claim 67, wherein the cover seal is configured as a plate.

77. The laser device of claim 67, wherein said elongated cavity is substantially cylindrically shaped.

* * * * *